United States Patent
Schachtl et al.

(10) Patent No.: US 7,248,011 B2
(45) Date of Patent: Jul. 24, 2007

(54) DRIVE FOR AUTOMATIC OPERATING OF A VEHICLE DOOR

(75) Inventors: Stephan Schachtl, Munich (DE); Ralf Reczko, Solingen (DE); Matthias Martin, Dachau (DE); Dietmar Bellenbaum, Vaihingen/Enz (DE); Thomas Vögerl, Abstatt (DE)

(73) Assignee: Valeo Sicherheitssysteme GmbH, Erdweg (DE)

( * ) Notice: Subject to any disclaimer, the term of this patent is extended or adjusted under 35 U.S.C. 154(b) by 0 days.

(21) Appl. No.: 10/561,599

(22) PCT Filed: Jul. 5, 2004

(86) PCT No.: PCT/EP2004/051356

§ 371 (c)(1),
(2), (4) Date: Dec. 20, 2005

(87) PCT Pub. No.: WO2005/005759

PCT Pub. Date: Jan. 20, 2005

(65) Prior Publication Data

US 2006/0279243 A1    Dec. 14, 2006

(30) Foreign Application Priority Data

Jul. 12, 2003 (DE) ............................. 103 31 633

(51) Int. Cl.
H02H 7/08 (2006.01)
(52) U.S. Cl. ............. 318/466; 318/445; 318/467; 318/468
(58) Field of Classification Search ........... 318/445, 318/467, 468, 466
See application file for complete search history.

(56) References Cited

U.S. PATENT DOCUMENTS 5,793,173 A    8/1998    Henschel et al.
5,982,126 A    11/1999   Hellinga et al.

(Continued)

FOREIGN PATENT DOCUMENTS

DE       195 23 210       10/1996

(Continued)

OTHER PUBLICATIONS

International Search Report for PCT/EP2004/051356 dated Jul. 4, 2005 (3 pages).

*Primary Examiner*—Rita Leykin
(74) *Attorney, Agent, or Firm*—Osha·Liang LLP

(57) ABSTRACT

The invention relates to a drive unit for automatically actuating a tailgate of a motor vehicle. Connecting the drive unit (4) to the vehicle door (1) or to a transmission device (6) by means of an output shaft (5), said transmission device executing a pivoting movement which corresponds to the pivoting movement of the vehicle door (1), and the drive unit (4) comprising at least one first sensor device (7), which can be connected to an electronic evaluation device (21) and serves to detect the respective angular position of the vehicle door (1). In order to make use of the advantages of an incrementally operating position measurement system of the vehicle door (1), in which, recalibration is necessary not only after the end positions of the vehicle door (1) are reached following a power cut. The invention proposes dividing the entire pivot angle (à) of the vehicle door (1) into at least three successive zones (pivot angle ranges) (à1-à4), it being possible to determine the individual pivot angle ranges (à1-à4) by means of a first sensor device (7), which is suitable for detecting absolute values. The pivot angle of the vehicle door within the individual zones (à1-à4) is then detected with the aid of a second sensor device (8), which comprises at least one incrementally operating measured value detector.

21 Claims, 5 Drawing Sheets

U.S. PATENT DOCUMENTS

| | | | |
|---|---|---|---|
| 6,028,370 A | * | 2/2000 | Lamm et al. ............... 307/10.1 |
| RE38,400 E | * | 1/2004 | Kowall et al. .............. 318/283 |
| 2004/0090083 A1 | | 5/2004 | Greuel et al. |
| 2005/0242762 A1 | * | 11/2005 | Assan ........................ 318/443 |

FOREIGN PATENT DOCUMENTS

| | | |
|---|---|---|
| DE | 196 49 698 | 10/1997 |
| DE | 101 17 935 | 10/2002 |
| DE | 102 36 887 | 2/2004 |
| FR | 2 757 110 | 6/1998 |
| GB | 2 307 758 | 6/1997 |
| GB | 2 320 586 | 6/1998 |
| WO | WO-2004/022392 | 3/2004 |

* cited by examiner

DRIVE FOR AUTOMATIC OPERATING OF A VEHICLE DOOR

BACKGROUND OF THE INVENTION

1. Field of the Invention

The invention relates to a drive unit for automatically actuating a vehicle door, in particular the tailgate of a motor vehicle, it being possible to connect the drive unit to the vehicle door or to a transmission device by means of an output shaft, said transmission device executing a pivoting movement which corresponds to the pivoting movement of the vehicle door, and the drive unit comprising at least one first sensor device which can be connected to an electronic evaluation device and serves to detect the respective angular position of the vehicle door.

2. Description of the Related Art

One requirement of vehicle doors which can be automatically actuated is for the respective position of the vehicle door to be determined by means of one or more sensors since this information is needed, inter alia, for controlling the speed of the vehicle door and for disconnecting the vehicle door when it reaches an end position or for identifying an obstruction. For example, in a tailgate which can be automatically actuated, a lower speed is therefore required just before it reaches the upper and lower end positions, so that the tailgate is not driven against the end stops with its full weight. It is also important, when closing the vehicle door, to move said door slowly toward the door seal just before it is completely closed, in order to minimize the risk of the driver or passengers being injured.

The respective position of the vehicle door is usually determined by means of rotation angle detectors which are arranged, for example, on the output shaft of the drive unit or the hinge connection of the vehicle door. In order to detect the absolute value of the corresponding rotation angle of the output shaft, potentiometers or analog magnetic field sensors are predominantly used as rotation angle detectors.

Some disadvantages of the analog rotation angle detectors are that they are associated with relatively high costs, some parts exhibit a high degree of wear, and moreover they require a great deal of installation space.

SUMMARY OF THE INVENTION

Although it is possible, in principle, to also determine the pivot angle of the vehicle door using incremental measured value detectors, which are substantially more cost-effective, these measured value detectors have the disadvantage that the data which characterizes an intermediate position of the vehicle door is generally lost when there is a power cut. It is therefore not possible to move the vehicle door out of an intermediate position in a controlled manner following a power cut. The system is recalibrated only after the vehicle door is closed (either automatically or manually), during which closing process the closing signal, for example, is used to form a new reference.

The invention is based on the object of specifying a drive unit for automatically actuating a vehicle door, which drive unit makes use of the advantages of an incrementally operating position measurement system but which is not recalibrated only after one of the end positions of the vehicle door is reached following a power cut.

According to the invention, this object is achieved by means of the features of claim 1. Further, particularly advantageous refinements of the invention are disclosed in the subclaims.

The invention is essentially based on the idea of dividing the entire pivot angle of the vehicle door into at least three successive zones (pivot angle ranges), it being possible to determine the individual pivot angle ranges by means of a first sensor device which is suitable for detecting absolute values. The pivot angle of the vehicle door within the individual zones is then detected with the aid of a second sensor device which comprises at least one incrementally operating measured value detector.

Following a power cut, it is not the exact position of the vehicle door but rather the respective zone in which the vehicle door is located that is identified in the drive unit according to the invention. The vehicle door can then be actuated by the drive unit at a prespecified, maximum permissible speed within this zone. When the vehicle passes from this zone to the next zone, the incremental electronics of the second sensor device are automatically recalibrated, so that the speed of the vehicle door can then be controlled as a function of position again.

The individual zones may advantageously be allocated specific functions. For example, provision may be made for the automatic closing (lower zone) and opening (upper zone) of the vehicle door to be impermissible in the end zones, or for the speed of the output shaft of the drive unit, and therefore the vehicle door as well, to have a precisely prespecified speed profile.

In order for the first sensor device for detecting the absolute values of the individual zones to operate with a low degree of wear, it has proven advantageous to use a magnetic measuring arrangement which comprises a magnet disk which is arranged, for example, on the output shaft of the drive unit and, as seen in the circumferential direction, has at least two magnetic regions of differing polarity. The magnetic measuring arrangement also comprises at least two magnetic field sensors which scan the magnetic regions of the magnet disk, the magnetic regions of the magnet disk and the magnetic field sensors being arranged with respect to one another in such a way that, when the output shaft of the drive unit rotates from the starting position to the end position and vice versa, at least three mutually adjacent angle ranges are produced, with, for each angle range, magnetic field sensors being associated with the magnetic regions in a different manner which is characteristic of this angle range.

It has also been found that the number and arrangement of the magnetic regions of the magnet disk and the magnetic field sensors should be chosen in such a way that, when the output shaft of the drive unit rotates from its staring position to its end position, the absolute values of at least four mutually adjacent pivot angle ranges can be detected.

The rotary shaft of the drive unit, on which rotary shaft the sensor devices are arranged, does not necessarily have to be the output shaft of the drive unit. It has therefore proven expedient, for example in a drive unit having a plurality of gear stages which are arranged in series, when the magnet disk of the first sensor device is arranged between two gear stages for reasons of space. However, an additional gear mechanism has to be provided in an arrangement of this type, this additional gear mechanism having an output device which executes a rotary movement which can be detected by the first sensor device and is analogous to that of the output shaft. This may, for example, be performed with the aid of a swash plate mechanism if the magnet disk is in the form of a swash plate.

BRIEF DESCRIPTION OF THE DRAWINGS

Further details and advantages of the invention emerge from the following exemplary embodiments which are explained with reference to figures, in which:

In FIG. 1, 1 denotes the tailgate of a motor vehicle, which tailgate is arranged such that it can pivot about a hinge pin 2 on the roof support 3 of a corresponding vehicle. The tailgate 1 is pivoted from its closed position, which is dented by I, to its opened position II, which is illustrated in FIG. 1, by means of a drive unit 4 whose longitudinal axis extends parallel to the hinge pin 2 and which actuates a lever arrangement 6 which is connected to the tailgate 1 on the output shaft 5 of the drive unit 4 (FIG. 2).

Figure 1:
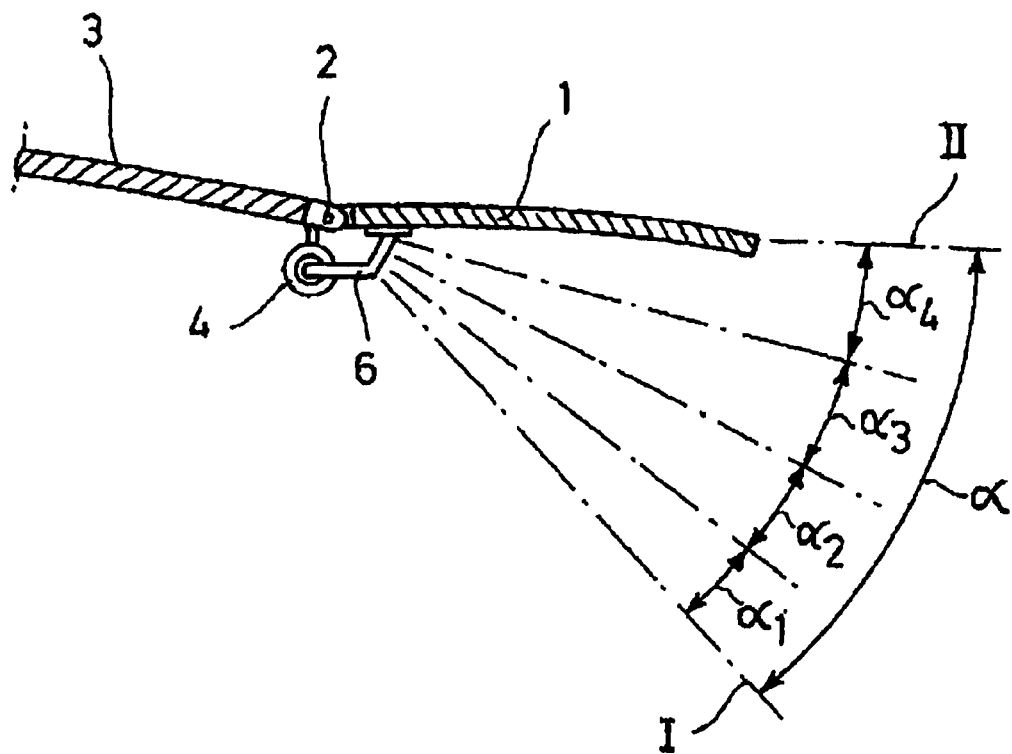
FIG. 1 shows the schematic view of an opened tailgate in the region of the roof support of a motor vehicle with a drive unit according to the invention which extends parallel to the hinge pin.

As can be seen from FIG. 1, the entire pivot angle a which is required between the opened and closed positions of the vehicle door is divided into four pivot angle ranges (zones) a1, a2, a3, and a4. The zone that the tailgate 1 is in when it moves into the opened or closed position or when it stops in an intermediate position is detected by means of two sensor devices 7, 8, which are integrated in the drive unit 4, and is described in even greater detail below.

Figure 2:
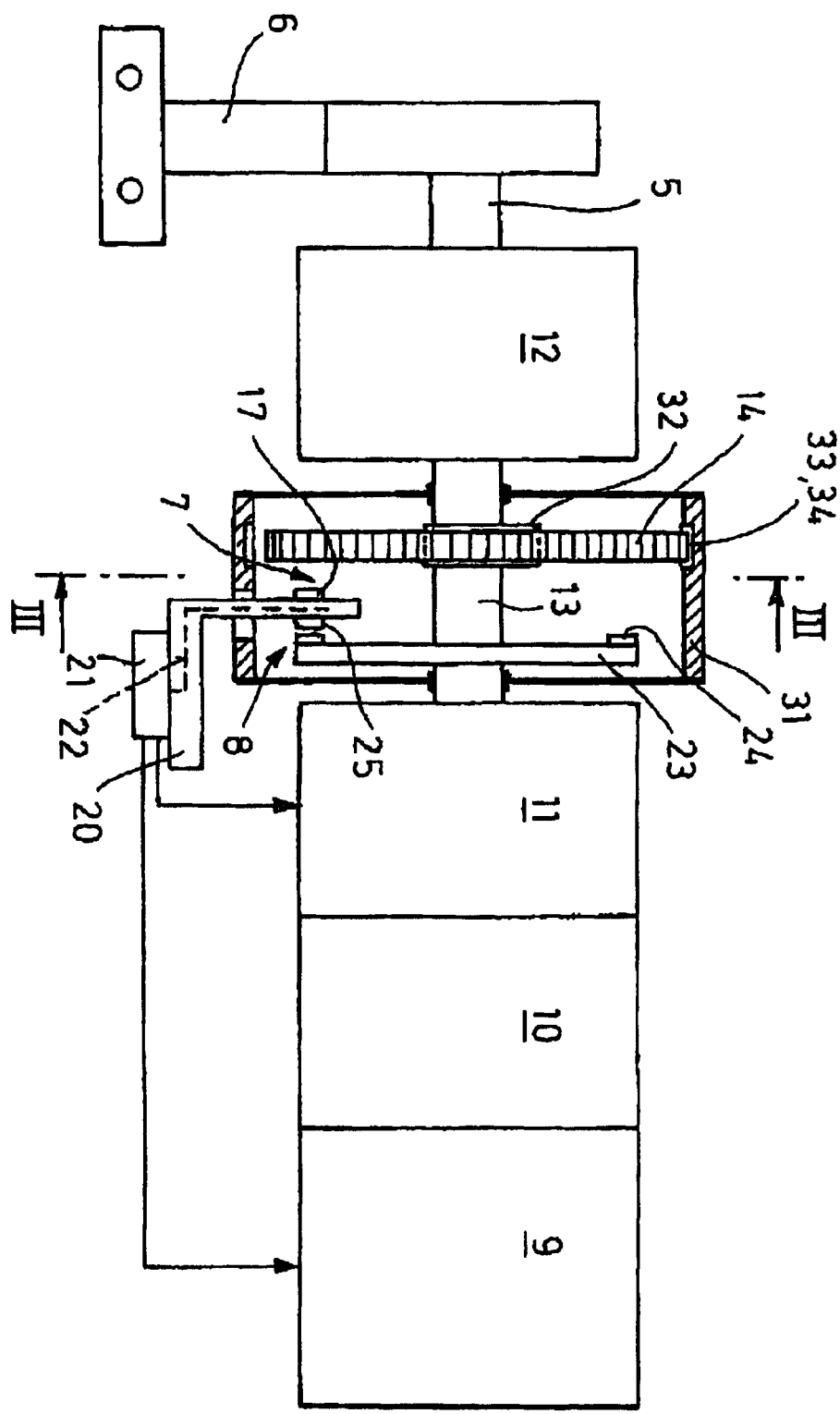
FIG. 2 shows the side view of a drive unit according to the invention having a first sensor arrangement, which comprises a magnet disk and magnetic field sensors, for detecting the absolute value of the pivot angle of the tailgate.

FIG. 2 illustrates the drive unit 4 according to the invention. This drive unit comprises an electric motor 9, a first gear stage 10, which is connected downstream of the electric motor 9, for reducing the rotational speed of the output shaft of the electric motor 9, a clutch 11, a second gear stage 12, whose output shaft 5 is identical to the output shaft of the drive unit 4 and executes a pivoting movement which corresponds to the pivoting movement of the tailgate 1 and which can be connected to the tailgate 1 (FIG. 1) by means of the lever arrangement 6. The two sensor devices 7, 8 for determining the position of the output shaft 5 of the drive unit 4, and therefore also of the tailgate 1, are arranged between the clutch 11 and the second gear stage 12 in a housing 31.

Figure 3:
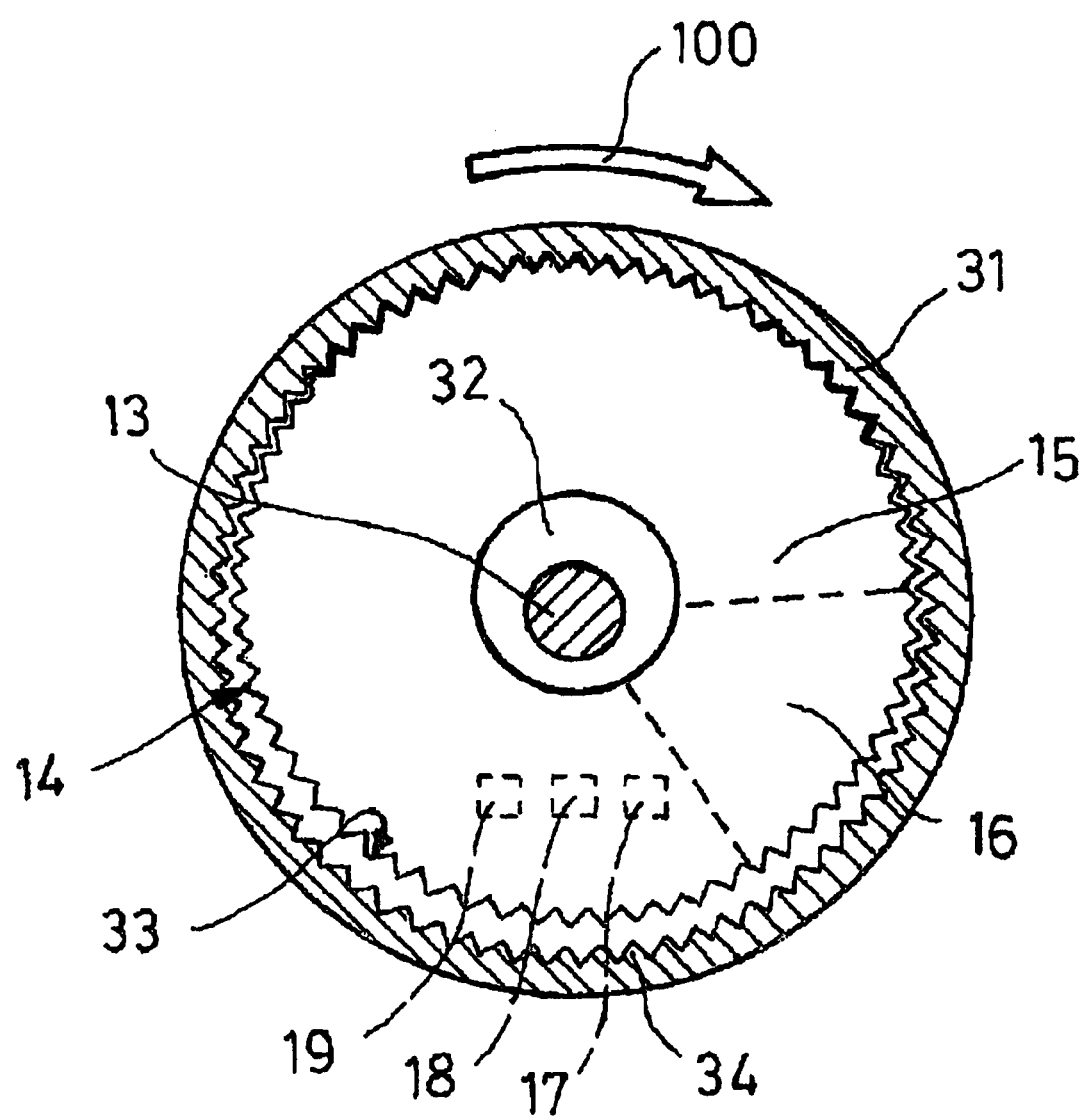
FIG. 3 shows a cross section along the section line which is denoted by III-III in FIG. 2, with the magnetic field sensors being illustrated dashed for indicating their position in relation to the magnet disk.

The first sensor device 7 is used to detect the absolute values of the four zones a1, a2, a3, and a4 of the tailgate 1. It comprises a first magnet disk 14 on the output shaft 13 of the clutch 11, which magnet disk is connected to said output shaft such that it can rotate, as illustrated in FIG. 3 for example, and which, as seen in the circumferential direction, has two magnetic regions 15, 16 of differing polarity. In this case, the region which is denoted by 15 in FIG. 3 forms the north pole and the magnetic region which is denoted by 16 forms the south pole.

In addition, the first sensor device 7 has three magnetic field sensors (for example Hall sensors) 17-19 which are positioned at a prespecified distance to the side of the first magnet disk 14 and are indicated in FIG. 3 by squares which are illustrated dashed. The magnetic field sensors 17-19 are arranged on a support 20 such that they are fixed to the housing (FIG. 2), with an electronic evaluation device 21 also being mounted on the support and being connected to the magnetic field sensors 17-19 via corresponding lines 22.

The first magnet disk 14 is in the form of a swash plate. To this end, it is arranged on a cam 32, which is in the form of an eccentric, of the output shaft 13 such that it can rotate and has teeth 33 on its outer circumference, with sections of these teeth engaging in corresponding teeth 34 of the housing 31 which is in the form of a ring gear (FIG. 3). When the output shaft 13 rotates, the magnet disk 14 is rolled on the ring gear of the housing 31 on account of being driven by the cam 32. As a result, the magnet disk 14 rotates in a wobbling manner which is slower than the rotation of the output shaft 13 of the clutch 11, the rotation of the magnet disk being chosen such that it corresponds to the rotation speed of the output shaft 5 of the second gear stage 12.

If the tailgate 1 is now actuated manually or by activation of the electric motor 9, the first magnet disk 14 rotates at a rotational speed which corresponds to that of the output shaft 5. The three magnetic field sensors 17-19 supply a logic signal which corresponds to the magnetic field picked up. If one of the sensors 17-19 is in the magnetic region 15, this sensor transmits, for example, a logic "1" to the electronic evaluation unit 21. If the respective sensor is in the magnetic region 16, a "0" is transmitted to the electronic evaluation unit 21.

Since, in the illustrated exemplary embodiment, all three of the sensors 17-19 are initially within the magnetic region 15, the first zone a1 is characterized by the logic signal 111. When the first magnet disk 14 rotates in the direction of the arrow 100 (FIG. 3), only the first sensor 17 initially enters the magnetic region 16 of the first magnet disk 14, while the two other sensors 18, 19 still remain in the magnetic region 15, so that the logic signal 011 is produced for the second zone a2. The third zone a3 is then unambiguously defined by the logic signal 001 and the fourth zone a4 is finally unambiguously defined by the signal 000.

Following a cut in the supply of power to the electronic evaluation device 21, the corresponding zone, in which the tailgate 1 is located, is immediately identified again because the signal value which characterizes this region is applied to the input of the evaluation device 21.

The second sensor device 8, which is in the form of an incremental measured value detector, is used to precisely determine the position of the tailgate 1 within the individual zones $_a1$-$_a4$. In the exemplary embodiment illustrated in FIG. 2, this second sensor device 8 comprises a second magnet disk 23 having a multiplicity of magnets 24 which are uniformly distributed over the circumference of said magnet disk. The second magnet disk 23 is mounted directly on the output shaft 13 of the clutch 11. The second sensor device 8 also comprises a magnetic field sensor 25 (for example a Hall sensor) which is likewise mounted on the support 20, which is fixed to the housing, and is electrically connected to the electronic evaluation device 21. The second sensor device 8 is preferably calibrated whenever the first sensor device 7 has detected a changeover to adjacent zones.

Following a power cut, the vehicle door is therefore initially actuated by the drive unit 4 within the respective zone $_a1$-$_a4$, which is detected by means of the first sensor device 7, at a prespecified, maximum permissible speed. When the vehicle door passes from this zone to the next zone, the incremental electronics, which are contained in the electronic evaluation device 21, of the second sensor device

8 are then automatically recalibrated and the speed of the tailgate 1 can then be, controlled as a function of position again.

It goes without saying that the invention is not restricted to the exemplary embodiment described above. Therefore, the two sensor devices may, for example, also be arranged directly on the output shaft 5 of the drive unit 4, with the result that a swash plate mechanism can be dispensed with.

Furthermore, the swash plate mechanism may be integrated in the second gear stage in a simple manner when this gear stage is a planetary gear whose housing is in the form of a ring gear anyway. In this case, the internal tooth system between the ring gear and the planetary wheels of the planetary gear may be different to that between the ring gear and the magnet disk (or magnet disk support).

The magnetic field sensors of the first sensor device may also be arranged along the outer edge of the magnet disk and at a distance from it. In addition, the magnet disk may also have more than two magnetic regions and only two sensors, for example, may scan the magnetic regions.

Figure 4:
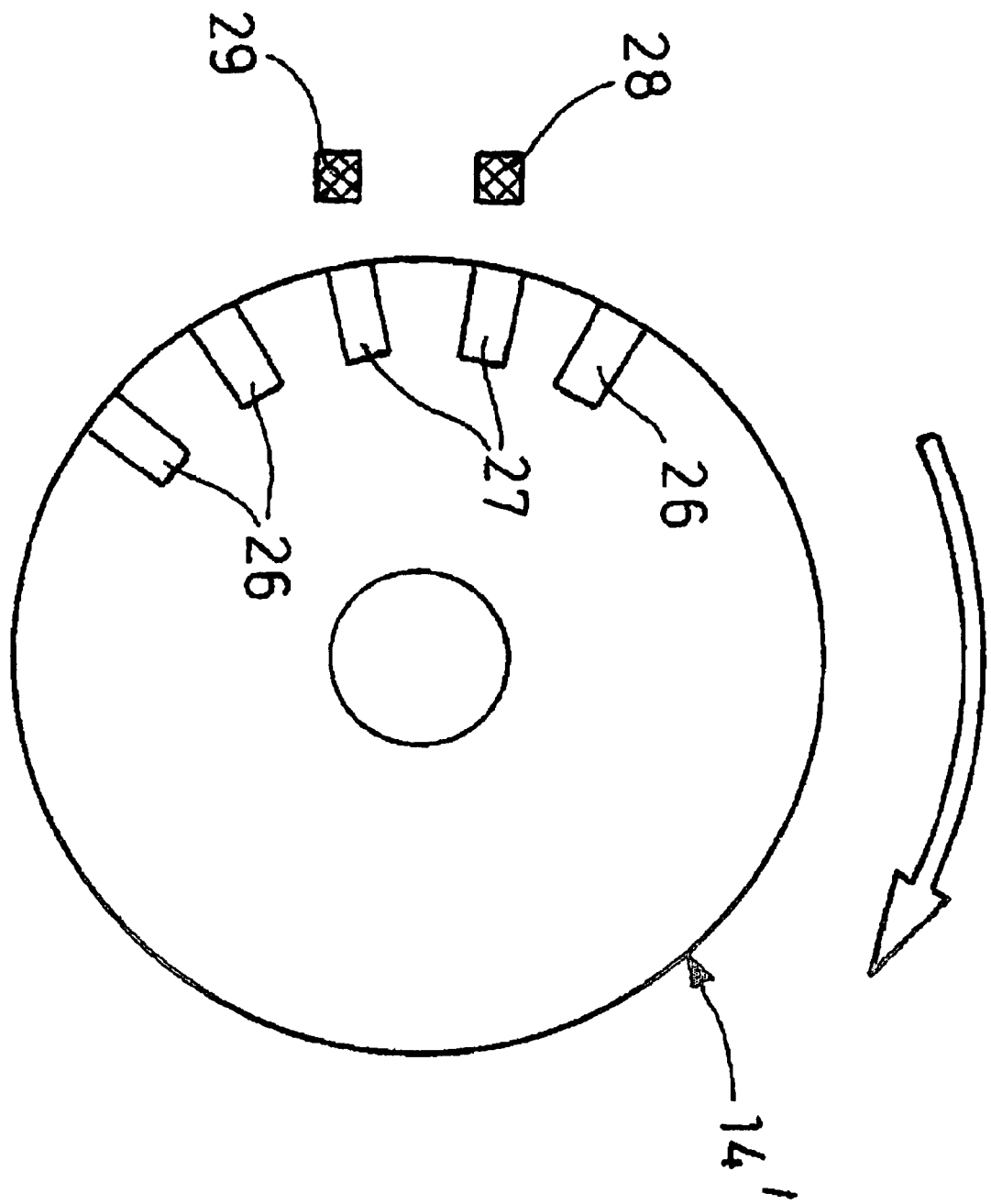
FIG. 4 shows a plan view of a second exemplary embodiment of a magnet disk of the first sensor arrangement, with the magnetic field sensors being illustrated for indicating their position in relation to the magnet disk.
Figure 5:
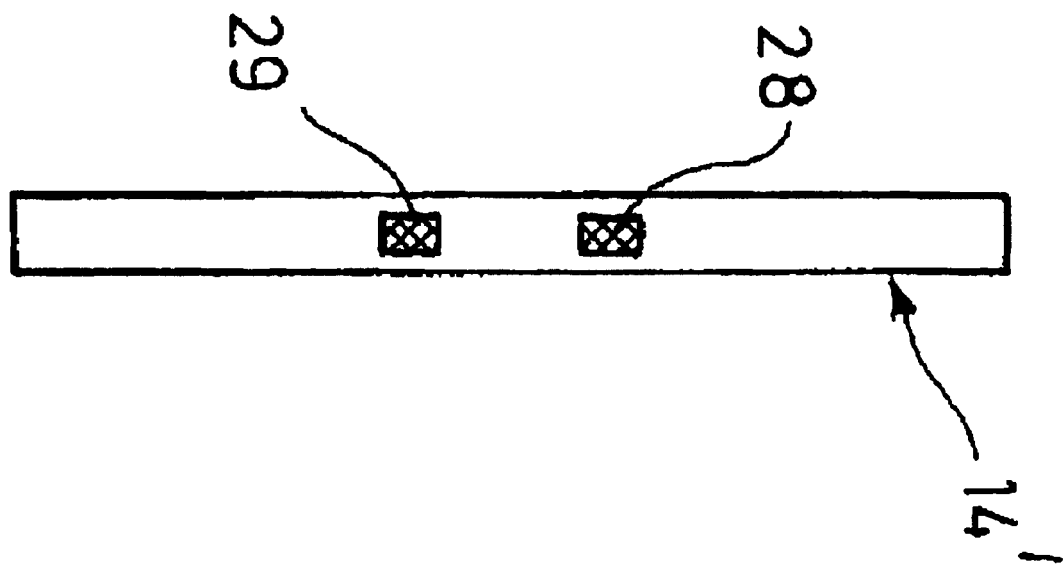
FIG. 5 shows a side view of the arrangement according to FIG. 4.

A corresponding exemplary embodiment can be found in FIGS. 4 and 5. In this case, the magnet disk 14' has five magnetic regions, with the magnetic regions denoted by 26 each forming a north pole region and the magnetic regions denoted by 27 each forming a south pole region, for example. If a "0" is associated with a first magnetic field sensor 28 and a "1" is associated with the respective second magnetic field sensor 29 when a magnetic region 26 is detected, the individual zones are unambiguously determined by the digital signal values 00, 10, 11, and 01.

LIST OF REFERENCE SYMBOLS

1 Tailgate, vehicle door
2 Hinge pin
3 Roof support
4 Drive unit
5 Output shaft (drive unit), rotary shaft
6 Lever arrangement, transmission device
7 (First) sensor device
8 (Second) sensor device
9 Electric motor
10 (First) gear stage
11 Clutch
12 Second gear stage
13 Output shaft (clutch), rotary shaft
14, 14' (First) magnet disk
15 Magnetic region (north pole)
16 Magnetic region (south pole)
17-19 Magnetic field sensors
20 Support
21 (Electronic) evaluation device
22 Line
23 Second magnet disk
24 Magnet
25 Magnetic field sensor
26 Magnetic region (north pole)
27 Magnetic region (south pole)
28 First magnetic field sensor
29 Second magnetic field sensor
30 Swash plate mechanism, gear mechanism
31 Housing, ring gear
32 Cam
34 teeth
100 Arrow I Closed position of the vehicle door/tailgate
II Opened position of the vehicle door/tailgate
$_a1$-$_a4$ Pivot angle ranges, zones

The invention claimed is:

1. A drive unit for automatically actuating a vehicle door, it being possible to connect the drive unit to the vehicle door or to a transmission device by means of an output shaft, said transmission device executing a pivoting movement which corresponds to the pivoting movement of the vehicle door, and the drive unit comprising at least one first sensor device which can be connected to an electronic evaluation device and serves to detect the respective angular position of the vehicle door, having the following features:
    (a) the first sensor device comprises a rotation angle measuring device for detecting the absolute value of at least three mutually adjacent pivot angle ranges ($_a1$-$_a4$ of the vehicle door, these pivot angle ranges covering the entire pivot angle between the closed position of the vehicle door and the opened position of the vehicle door, and
    (b) the drive unit comprises at least one second sensor device which has at least one incremental measured value detector for measuring the relative position of the output shaft of the drive unit in relation to the start or the end of the respective pivot angle range.

2. The drive unit as claimed in claim 1, characterized in that the first sensor device for detecting the absolute value of the pivot angle ranges of the vehicle door is arranged on the output shaft of the drive unit and detects its pivoting movement.

3. The drive unit as claimed in claim 1, characterized in that, in the case of a drive unit with a plurality of gear stages arranged in series, the first sensor device is arranged between two gear stages, and in that an additional gear mechanism is provided and has an output device which executes a rotary movement which can be detected by the first sensor device and is analogous to the output shaft.

4. The drive unit as claimed in claim 2, characterized in that the first sensor device comprises at least one first magnetic disk which is arranged on the output shaft of the drive unit or on the output device of the additional gear mechanism and, as seen in the circumferential direction, has at least two magnetic regions of differing polarity, and comprises at least two magnetic field sensors which scan the magnetic regions of the magnetic disk, the magnetic regions of the magnetic disk and the magnetic field sensors being arranged with respect to one another in such a way that, when the output shaft of the drive unit or the output device of the additional gear mechanism rotates from the starting position to the end position and vice versa, at least three mutually adjacent angle ranges are produced, with, for each angle range, magnetic field sensors being associated with the magnetic regions in a different manner which is characteristic of this angle range.

5. The drive unit as claimed in claim 4, characterized in that the number and arrangement of the magnetic regions of the magnetic disk and the magnetic field sensors are chosen in such a way that, when the output shaft of the drive unit or the output device of the additional gear mechanism rotates from its starting position to its end position, the absolute values of at least four mutually adjacent pivot angle ranges can be detected.

6. The drive unit as claimed in claim 5, characterized in that the two magnetic regions of differing polarity are sector-like and the magnetic field sensors are arranged next to one another in such a way that the magnetic field of the first magnetic region is initially applied to all three magnetic field sensors in the starting position and, when the output device of the additional gear mechanism rotates, the magnetic field sensors then successively move into the second magnetic region.

7. The drive unit as claimed in claim 4, characterized in that the magnetic field sensors are arranged along the outer edge of the magnetic disk and at a distance from it.

8. The drive unit as claimed in claim 4, characterized in that the magnetic field sensors are positioned at a prescribed distance to the side of the magnetic disk.

9. The drive unit as claimed in claim 3, characterized in that the first magnetic disk of the first sensor device is in the form of a swash plate of a swash plate mechanism, with the magnetic disk being arranged on a cam, which is connected to the output shaft such that they rotate together and is in the form of an eccentric, such that it can rotate and in some regions rolls on a ring gear which is fixed to the housing.

10. The drive unit as claimed in claim 9, characterized in that the second gear stage is a planetary gear whose housing is in the form of a ring gear for the swash plate mechanism.

11. The drive unit is claimed in claim 4, characterized in that the magnetic field sensors are Hall sensors.

12. The drive unit as claimed in claim 3, characterized in that the first sensor device comprises at least one first magnetic disk which is arranged on the output shaft of the drive unit or on the output device of the additional gear mechanism and, as seen in the circumferential direction, has at least two magnetic regions of differing polarity, and comprises at least two magnetic field sensors which scan the magnetic regions of the magnetic disk, the magnetic regions of the magnetic disk and the magnetic field sensors being arranged with respect to one another in such a way that, when the output shaft of the drive unit or the output device of the additional gear mechanism rotates from the starting position to the end position and vice versa, at least three mutually adjacent angle ranges are produced, with, for each angle range, magnetic field sensors being associated with the magnetic regions in a different manner which is characteristic of this angle range.

13. The drive unit as claimed in claim 12, characterized in that the number and arrangement of the magnetic regions of the magnetic disk and the magnetic field sensors are chosen in such a way that, when the output shaft of the drive unit or the output device of the additional gear mechanism rotates from its starting position to its end position, the absolute values of at least four mutually adjacent pivot angle ranges can be detected.

14. The drive unit as claimed in claim 12, characterized in that the two magnetic regions of differing polarity are sector-like and the magnetic field sensors are arranged next to one another in such a way that the magnetic field of the first magnetic region is initially applied to all three magnetic field sensors in the starting position and, when the output device of the additional gear mechanism rotates, the magnetic field sensors then successively move into the second magnetic region.

15. The drive unit as claimed in claim 5, characterized in that the magnetic field sensors are arranged along the outer edge of the magnetic disk and at a distance from it.

16. The drive unit as claimed in claim 6, characterized in that the magnetic field sensors are arranged along the outer edge of the magnetic disk and at a distance from it.

17. The drive unit as claimed in claim 5, characterized in that the magnetic field sensors are positioned at a prescribed distance to the side of the magnetic disk.

18. The drive unit as claimed in claim 6, characterized in that the magnetic field sensors are positioned at a prescribed distance to the side of the magnetic disk.

19. The drive unit as claimed in claim 2, characterized in that the first magnetic disk of the first sensor device is in the form of a swash plate of a swash plate mechanism, with the magnetic disk being arranged on a cam, which is connected to the output shaft such that they rotate together and is in the form of an eccentric, such that it can rotate and in some regions rolls on a ring gear which is fixed to the housing.

20. The drive unit as claimed in claim 19, characterized in that the second gear stage is a planetary gear whose housing is in the form of a ring gear for the swash plate mechanism.

21. The drive unit is claimed claim 12, characterized in that the magnetic field sensors are Hall sensors.

* * * * *